United States Patent [19]

Galtier

[11] Patent Number: 4,593,781
[45] Date of Patent: Jun. 10, 1986

[54] MOTOR VEHICLE STEERING SYSTEM ASSISTED BY AN ELECTRIC MOTOR

[75] Inventor: Lucien Galtier, Morsang S/Orge, France

[73] Assignees: Automobiles Citroen, Neuilly; Automobiles Citroen, Paris, both of France

[21] Appl. No.: 681,492

[22] Filed: Dec. 13, 1984

[30] Foreign Application Priority Data

Dec. 16, 1983 [FR] France ............................ 83 20520

[51] Int. Cl.$^4$ ............................................. B62D 5/04
[52] U.S. Cl. ................................................ 180/79.1
[58] Field of Search ............................ 180/79.1, 79.3; 74/388 PS

[56] References Cited

U.S. PATENT DOCUMENTS

| 4,241,804 | 12/1980 | Deininger et al. | 180/79.1 |
| 4,415,054 | 11/1983 | Drutchas | 180/79.1 |
| 4,416,345 | 11/1983 | Barthelemy | 180/79.1 |

*Primary Examiner*—John A. Pekar
*Attorney, Agent, or Firm*—Karl F. Ross; Herbert Dubno

[57] ABSTRACT

A motor vehicle steering system comprising a steering column having teeth engaged with a rack connected by steering levers to the steering wheels of the motor vehicle, in which an electric motor is adapted for moving the rack through a pair of clutches, each clutch being associated with one of the directions of movement of the rack, and means responsive to the movement of a portion of the housing of the rack exerted thereon by the force of the rack when the steering wheels are turned for engaging one of another of the clutches, depending on the direction of the force acting on the rack.

6 Claims, 6 Drawing Figures

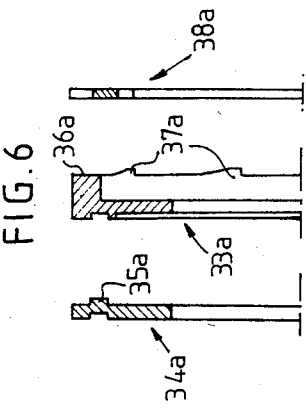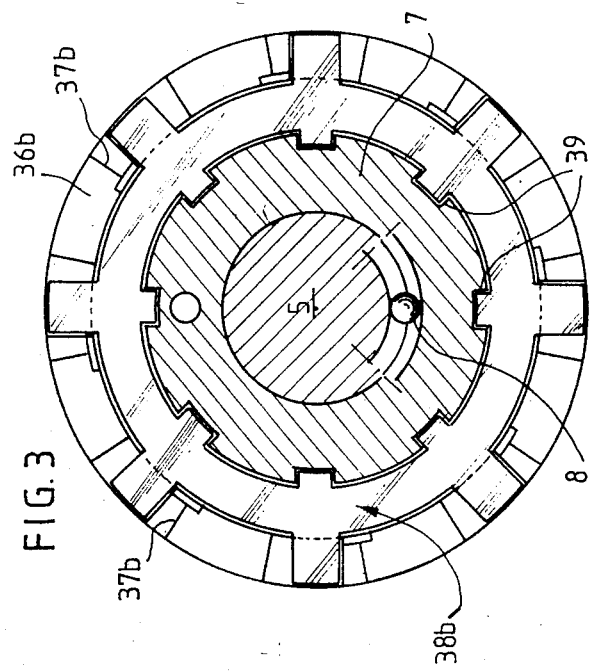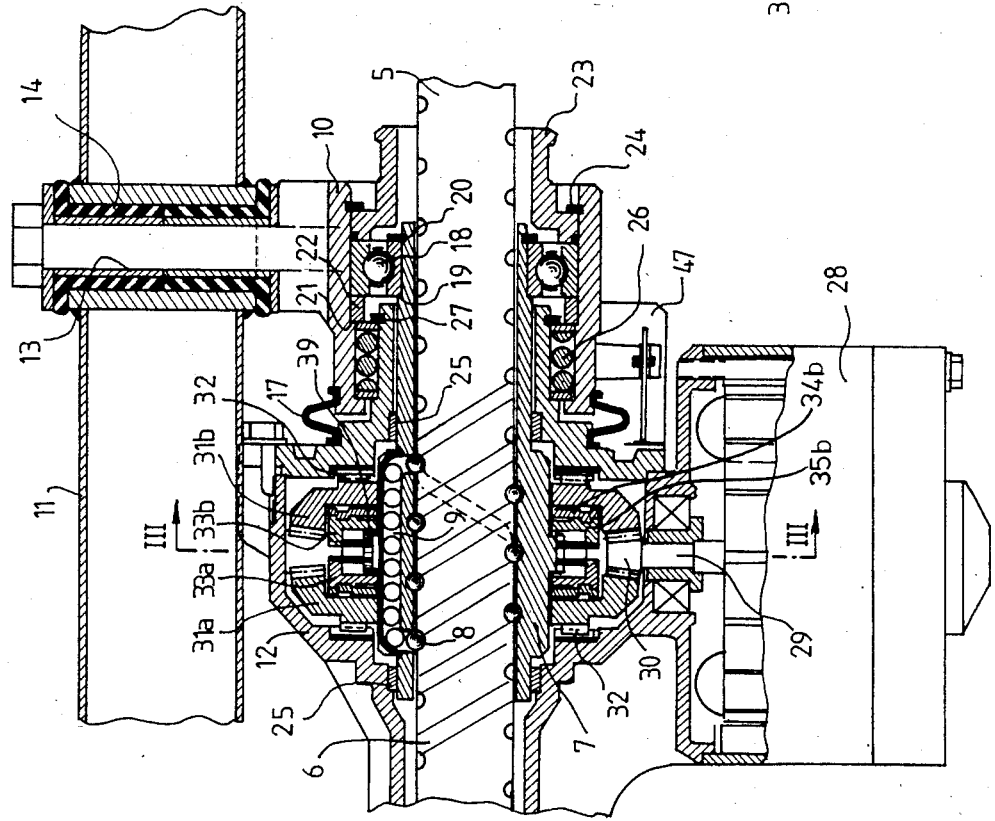

MOTOR VEHICLE STEERING SYSTEM ASSISTED BY AN ELECTRIC MOTOR

FIELD OF THE INVENTION

The present invention relates to motor vehicle steering systems comprising a steering column having teeth engaged with a rack connected by steering levers to the steering wheels of the vehicle. An electric motor adapted for moving the rack through two clutches each associated with one of the directions of movement of the rack and means sensitive to the force exerted on the rack for engaging one or another clutch depending on the direction of this force.

BACKGROUND OF THE INVENTION

In assisted steering systems of this kind which are presently available, the electric motor exerts its assistance action on the steering column by causing it to pivot. But experience shows that the response of the motor to the force exerted by the steering column on the rack is relatively slow and that these assisted steering systems have poor endurance.

U.S. Pat. No. 4,415,054 describes a motor vehicle steering system of the above type, in which the electric motor is connected directly to the rack on which it may act by moving it longitudinally.

OBJECTS OF THE INVENTION

The purpose of the present invention is to improve the assisted steering systems of the above type so as to increase their speed of response and to improve their endurance.

SUMMARY OF THE INVENTION

In the assisted steering system of the invention, the rack is contained in a case comprising a fixed part secured to the structure of the vehicle and a part which is mobile in the direction of the rack and on which the steering column is mounted, resilient means tending to maintain the mobile part in a mean position from which it may move in one direction or in the opposite direction, and the steering system comprises means controlled by the movement of the mobile part for engaging one or other of the clutches, the clutch engaged depending on the direction of the movement of this mobile part.

When the driver actuates the steering shaft, the reaction of the steering wheels opposes the movement of the rack so that the steering column moves slightly taking the mobile part of the case with it, which engages one or other clutch, the motor then driving the rack in the desired direction.

The clutches are preferably friction clutches disposed coaxially to the rack. In this case, engagement of one or other of the clutches depends on the movement of the mobile part, so on the reaction of the wheels. The assisting force is thus proportioned to this reaction.

The rack may comprise over a part of its length a threaded portion on which is engaged a nut secured against translational movement, the clutches being interposed between this nut and the motor.

The output shaft of the motor may be connected to two toothed rings coaxial with the rack, so that these rings turn in opposite directions, each of these rings being connected by a free wheel to the nut and the clutches being interposed between the rings and the motor.

The electric motor may be disposed so that its output shaft is perpendicular to the rack, this shaft comprising a bevel gear interposed between the toothed rings and meshing therewith.

The electric motor may also have its output shaft coaxial to the rack and connected to the toothed rings by pinions.

The steering system may comprise a detector responsive to the movement of the mobile part of the case and adapted for switching on the electric motor before engagement of one or other of the clutches.

BRIEF DESCRIPTION OF THE DRAWING

Two embodiments of the assisted steering system of the invention are described hereafter by way of non limitative examples with reference to the accompanying drawing in which:

FIG. 2 is an axial sectional view on larger scale of a detail of this embodiment;

FIG. 3 is a cross sectional view taken along line III—III of FIG. 2;

FIG. 6 shows in section a detail of a clutch, the elements of this clutch being shown separated.

SPECIFIC DESCRIPTION

Figure 1:
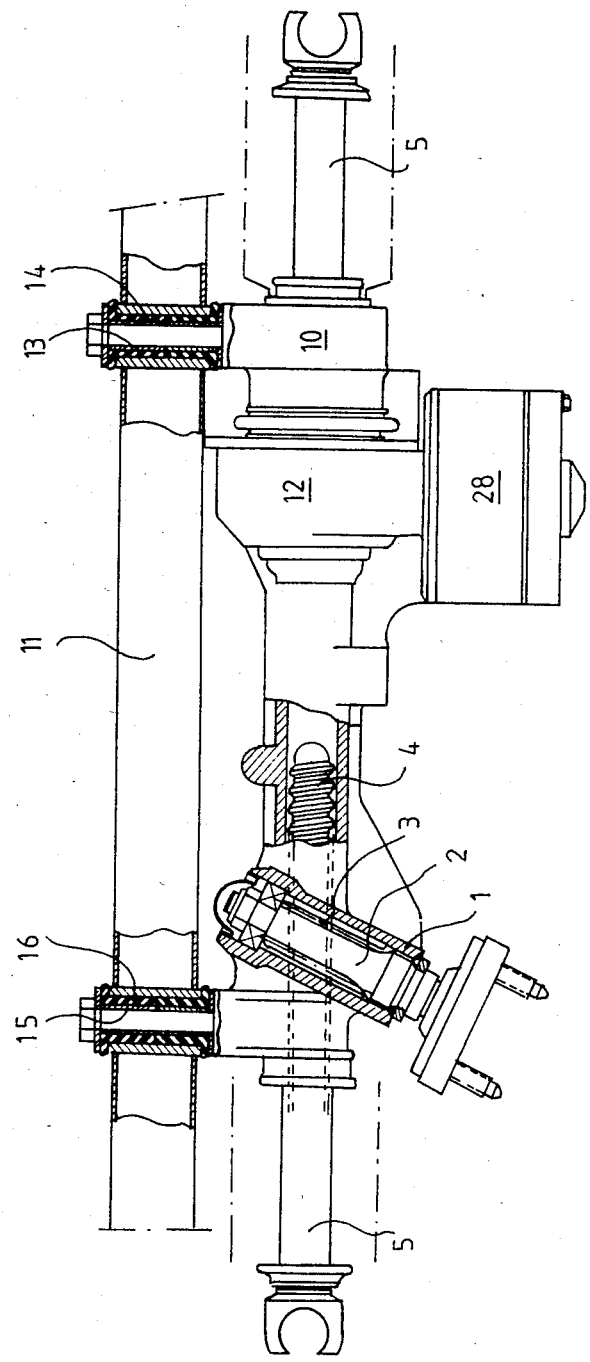
FIG. 1 is an elevational view in partial section of a first embodiment of the invention.

FIG. 1 shows a steering column 1 in which the steering shaft 2 is rotatably mounted. This latter comprises teeth 3 which project through an opening in column 1 and engage with the teeth 4 of a rack 5. This rack is connected by levers not shown to the steering wheels of the vehicle. The set of teeth 4 is formed over a length of the rack corresponding to the maximum clearance required for pivoting of the steering wheels (see FIG. 2).

Over a part of its length the rack comprises a screw thread 6 formed of three parallel threads and engaged in a nut or socket 7 comprising balls 8; the return track for the balls can be seen at 9.

Rack 5 is housed in a case comprising a part 10 which is fixed with respect to a cross piece 11 of the vehicle and a part 12 which may move with respect to this cross piece, along the axis of the rack. Part 10 is fixed to cross piece 11 by a bolt 13 with a ring 14 interposed therebetween which is sufficiently flexible to allow mounting, the bolt being tightened after adjustment. On the other side, part 12 is connected to the cross piece 11 by a bolt 15 with interpositioning of a resilient ring 16. The two parts 10 and 12 of the case are connected together by a resilient scaling bellows 17. The steering column 1 is supported by the mobile part 12 of the case.

A bearing 18 is held in engagement against an internal shoulder 21 of the fixed part 10 of the case, with interpositioning of a ring 22 by means of a plug 23 which is engaged in part 10 and is itself held in position by a circlip 24. Nut 7 is thus immobilized longitudinally with respect to part 10; it further rests on the mobile part 12 through anti friction rings 25 allowing this mobile part to move longitudinally with respect to the nut.

A spring 26, interposed between shoulders of the fixed part 10 and mobile part 12 on one end and ring 22 and a circlip 27 on the other end tends to maintain these fixed and mobile parts in a relative mean position, part 12 being able to move axially with respect to part 10 in one direction or in the other from this mean position.

In the embodiment shown in FIGS. 1 to 3, an electric motor 28 is fixed to the mobile part 12 of the case, its output shaft 29 being orientated perpendicularly to rack 5. A bevel gear 30 fixed to shaft 29 meshes with two toothed rings 31a and 31b which are mounted for rotation on nut 7, on each side of the axis of shaft 29, so that they rotate in opposite directions and may move axially on this nut. These two rings bear on the mobile part 12 of the case through roller bearings 32.

Each of the toothed rings 31a and 31b is connected to nut 7 by a friction clutch which is disposed inside the ring and which is engaged when the mobile part 12 of the case moves in its direction. In the mean position of part 12, defined by spring 26, none of the two clutches is engaged.

Each of the clutches comprises a hub 33a or 33b which is mounted free on nut 7 and whose face turned towards the corresponding ring is engaged with a clutch disk 34a or 34b by means of projections 35a or 35b with which this disk is provided. Each of hubs 33a or 33b has a rim 36a or 36b whose edge has teeth 37a or 37b; these teeth having a sharp edge in one direction and a slanting edge in the opposite direction (see FIG. 6).

On nut 7 are mounted two drive washers 38a and 38b. Each of these washers comprises on its inner perimeter teeth which are engaged in peripheral grooves 39 in nut 7, so that this nut is locked in rotation with the washer. It also comprises on its outer perimeter teeth which engage in the teeth 37a or 37b of the hubs 33a or 33b (see FIG. 3).

The drive washers 38a and 38b play the role of free wheels. A hub 33a or 33b may drive the corresponding washer 38a or 38b, and thereby nut 7; conversely, if the washer is rotated by the nut, it slides over the slanted side of teeth 37a or 37b of the hub 33a or 33b without engagement.

When the driver causes shaft 2 to rotate, the reactions of the steering wheels tend to oppose movement of the rack so that column 1 moves along the axis of the rack, in one direction or the other, depending on the direction of rotation of shaft 2.

When moving, column 1 shifts the mobile part 12 of the case, and thus rings 31a and 31b, against the action of spring 6. Ring 31a for example is thus applied against the clutch disk 34a with a force which depends on the reaction of the steering wheels, so that they rotate hub 33a, washer 37a and nut 7. Since this nut is secured against translation, it causes rack 5 to move in the direction in which shaft 2 acts. If the movement of this shaft changes direction, ring 31b becomes activated in its turn and causes the rack to move in the opposite direction.

Figure 4:
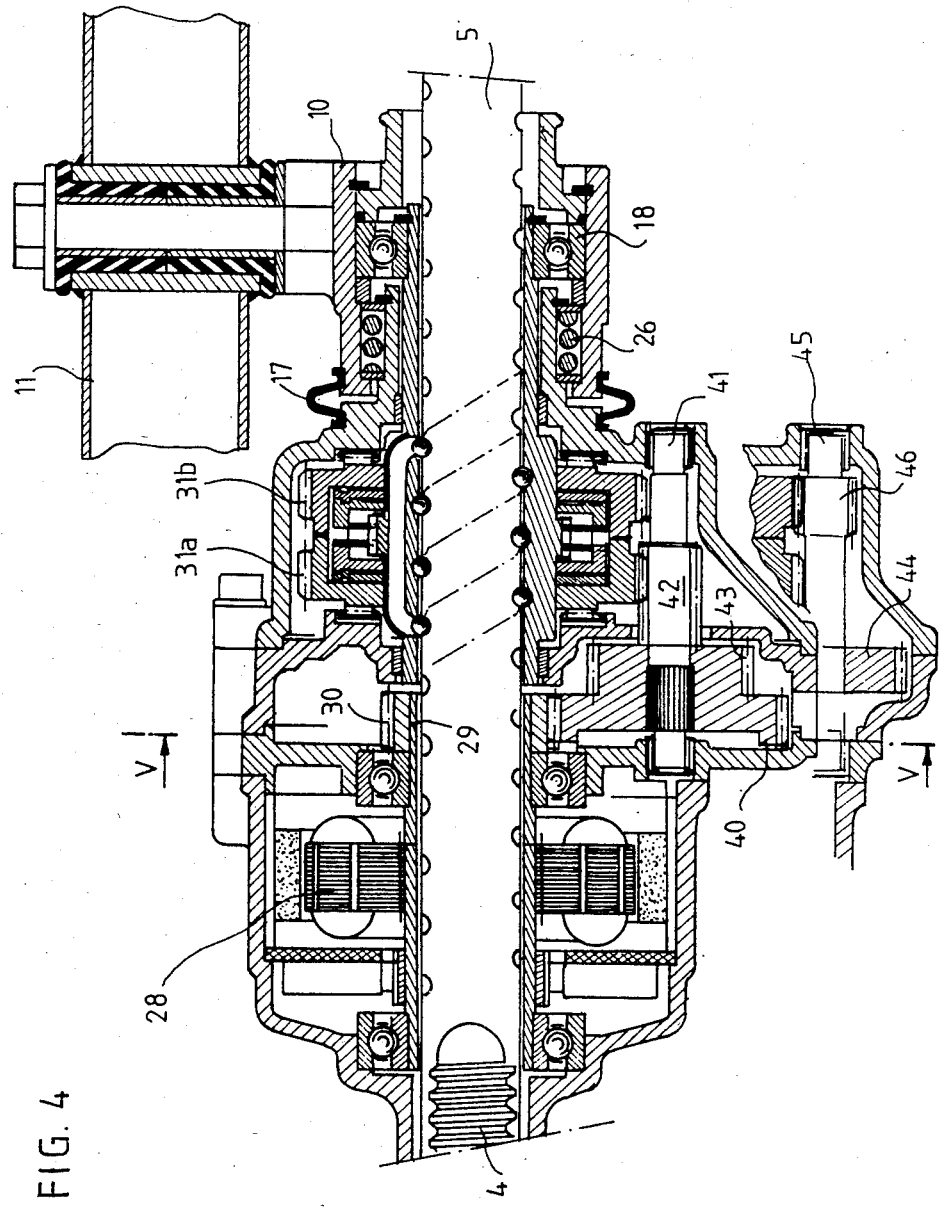
FIG. 4 is an axial sectional view of a second embodiment of the invention.
Figure 5:
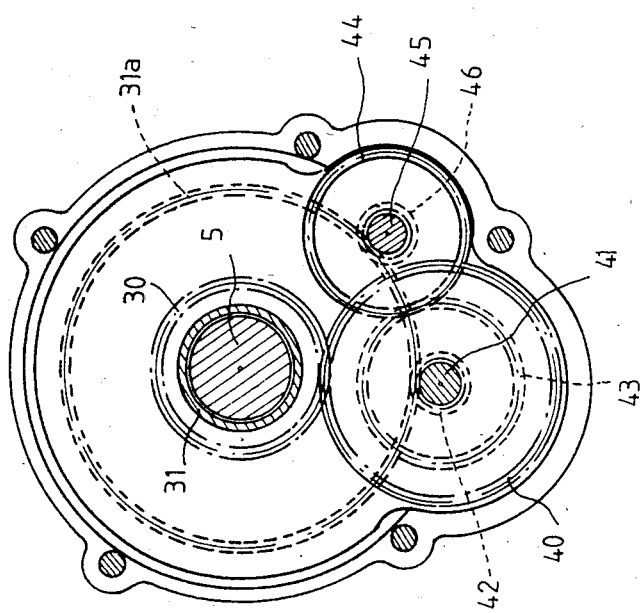
FIG. 5 is a cross sectional view taken along line V—V of FIG. 4.

In the embodiment shown in FIGS. 4 and 5, the electric motor 28 is mounted coaxially to the rack 5. Pinion 30 fixed on the output shaft 29 meshes with a pinion 40 splined to a shaft 41. This shaft further comprises a pinion 42 meshing with ring 31a and a pinion 43 meshing with a reversing pinion 44. This latter is fixed on a shaft 45 which also comprises a pinion 46 meshing with the ring 31b.

Reference 47 designates a detector which could be electronic or electromechanical. This detector 47 which is secured to the fixed part 10 of the case and comprises a control element secured to the mobile part 12, detects the relative movement of the fixed and mobile parts and switches on the electric motors 28 or 38 before engagement of the clutch.

The steering system which has just been described has more especially the following advantages:
- it forms a compact assembly with a volume better distributed about the rack, which may facilitate fitting to the vehicle.
- if it is desired to replace a mechanical steering system on a vehicle by an assisted steering system, the number of specific parts is reduced.
- remote positioning of the assistance means with respect to the driver, in particular the electric motor, which limits the risks of noises and vibrations,
- the mechanical connections between the steering wheel and the wheels are identical to those of the mechanical steering system; the assistance means introduces no play.

It goes without saying that the present invention is not considered as limited to the two embodiments described and shown but covers, on the contrary, all variants thereof.

What is claimed is:

1. In a motor vehicle steering system with assisted control comprising a steering column having teeth meshing with a rack connected by steering levers to the steering wheels on the vehicle, an electric motor for moving the rack through two clutches each associated with one of the directions of movement of the rack, and means responsive to the force exerted between said steering column and said rack for engaging one or another of said clutches depending on the direction of said force, the improvement wherein said rack is contained in a case comprising a fixed part secured to the structure of said vehicle and a part which is mobile in the direction of said rack and on which said steering column is mounted, resilient means tending to maintain said mobile part in a mean position from which it may move in one direction or in the opposite direction, and said means responsive to said force includes said mobile part for engaging one or another of said clutches, the clutch engaged depending on the direction of the movement of said mobile part by said steering column and as a function of the movement of said mobile part.

2. The steering system defined in claim 1 wherein said clutches are friction clutches and are disposed coaxially with said rack.

3. The steering system defined in claim 1 wherein said rack is formed over a part of the length thereof with a threaded portion on which a nut is engaged and secured against translational movement, and said clutches are interposed between said nut and said motor.

4. The steering system defined in claim 2 wherein the output shaft of said motor drives a pair of toothed rings coaxial with said rack whereby said rings rotate in opposite directions, each of said rings being connected by a free wheel to said nut and said clutches being interposed between said rings and said motor.

5. The steering system defined in claim 4 wherein said electric motor has its output shaft perpendicular to said rack, said shaft comprising a bevel gear interposed between said toothed rings and meshing therewith.

6. The steering system defined in claim 1 further comprising a detector responsive to the movement of said mobile part of said case and adapted for switching on said electric motor before engagement of one or another of said clutches.

* * * * *